US009898974B2

(12) United States Patent
Wen et al.

(10) Patent No.: US 9,898,974 B2
(45) Date of Patent: Feb. 20, 2018

(54) DISPLAY DRIVE SCHEME WITHOUT RESET

(71) Applicant: QUALCOMM MEMS Technologies, Inc., San Diego, CA (US)

(72) Inventors: Bing Wen, Poway, CA (US); Edward Keat Leem Chan, San Diego, CA (US)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 14/629,191

(22) Filed: Feb. 23, 2015

(65) Prior Publication Data

US 2016/0247463 A1 Aug. 25, 2016

(51) Int. Cl.

| | |
|---|---|
| ***G06F 3/045*** | (2006.01) |
| ***G09G 3/34*** | (2006.01) |
| ***G09G 3/20*** | (2006.01) |

(52) U.S. Cl.
CPC ......... *G09G 3/3466* (2013.01); *G09G 3/2003* (2013.01); *G09G 2320/0666* (2013.01)

(58) Field of Classification Search
CPC ..... G09G 2320/029; G09G 2320/0693; G09G 2330/12; G09G 3/00; G09G 3/006; G09G 3/3466; H02N 1/006
See application file for complete search history.

(56) References Cited

U.S. PATENT DOCUMENTS

| | | | | |
|---|---|---|---|---|
| 8,102,592 | B2 | 1/2012 | Ji | |
| 2002/0054424 | A1* | 5/2002 | Miles | B82Y 20/00 359/291 |
| 2004/0218341 | A1* | 11/2004 | Martin | G02B 26/001 361/278 |
| 2004/0227493 | A1 | 11/2004 | Van et al. | |
| 2006/0066926 | A1* | 3/2006 | Kwak | G09G 3/2003 358/518 |
| 2009/0201282 | A1 | 8/2009 | Govil | |
| 2013/0050165 | A1 | 2/2013 | Northway et al. | |
| 2013/0135324 | A1 | 5/2013 | Hong et al. | |
| 2013/0135364 | A1* | 5/2013 | Govil | G09G 5/10 345/690 |
| 2013/0135705 | A1 | 5/2013 | Hong et al. | |
| 2013/0321379 | A1 | 12/2013 | Van et al. | |
| 2014/0092110 | A1 | 4/2014 | Chan et al. | |

OTHER PUBLICATIONS

International Search Report and Written Opinion—PCT/US2016/016166—ISA/EPO—dated Mar. 24, 2016.

* cited by examiner

*Primary Examiner* — Insa Sadio
(74) *Attorney, Agent, or Firm* — Weaver Austin Villeneuve & Sampson LLP

(57) ABSTRACT

This disclosure provides systems, methods and apparatus for a display drive scheme without a reset. In one aspect, a first voltage can be applied to an electrode of a display unit to position a movable element from a first position towards a second position, and a second voltage can be applied to the electrode of the display unit to position the movable element to the second position.

15 Claims, 19 Drawing Sheets

DISPLAY DRIVE SCHEME WITHOUT RESET

TECHNICAL FIELD

This disclosure relates to electromechanical systems and devices. More specifically, this disclosure relates to a display drive scheme without a reset.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities.

One plate, or movable element of the IMOD display element, can move from an initial position associated with a first color to a second, new position such that the IMOD display element provides a second, new color. Transitioning directly from the initial position to the second position may introduce errors such that the position of the plate is at a slightly incorrect position rather than the expected second position. More errors may be introduced and accumulated when the position of the plate is to move from the second position to a third position. Accordingly, rather than transitioning directly from the initial position to the second position, an intermediate reset position may first be transitioned to in order to reduce the accumulation of errors, followed by transitioning from the intermediate reset position to the second position. Afterwards, the plate may be positioned back to the reset position and then repositioned to the third position. As such, using the intermediate reset position may reduce accumulated errors.

However, moving the plate to the reset position before moving to the new position may introduce visual artifacts, decrease color saturation, and require extra circuitry to provide the reset functionality.

SUMMARY

The systems, methods and devices of this disclosure each have several innovative aspects, no single one of which is solely responsible for the desirable attributes disclosed herein.

One innovative aspect of the subject matter described in this disclosure can be implemented in a circuit including a controller capable of determining a first voltage to apply to an electrode of a display unit of an array of display units to position a movable element of the display unit from a first position towards a second position, and the controller further capable of determining a second voltage to apply to the electrode of the display unit to position the movable element of the display unit at the second position.

In some implementations, the first voltage can correspond with a transition in color of the display unit, the first position corresponding with a first color, and the second position corresponding with a second color.

In some implementations, positioning the movable element of the display unit from the first position towards the second position can include moving the movable element into a range including the second position.

In some implementations, the second voltage can correspond with a voltage to position the movable element from a position in the range to the second position.

In some implementations, the controller can further be capable of determining a third voltage to apply to the electrode of the display unit to release the movable element of the display unit from hysteresis.

In some implementations, releasing the movable element of the display unit from hysteresis can include positioning the movable element to a position outside of a hysteresis region.

In some implementations, the circuit can include a frame buffer including data indicating a current color corresponding to the first position of the movable element of the display unit; and a storage device to store lookup tables (LUTs) indicating the first voltage and the second voltage.

In some implementations, the controller can determine the first voltage and the second voltage based on the data indicating the current color corresponding to the first position of the movable element, and image data indicating an intended color corresponding to the second position of the movable element.

In some implementations, the circuit can include a display including the array of display units; a processor that is capable of communicating with the display device, the processor being configured to process image data; and a memory device that is capable of communicating with the processor.

In some implementations, the circuit can include a driver circuit capable of sending at least one signal to the display; and wherein the controller is capable of sending at least a portion of the image data to the driver circuit.

In some implementations, the circuit can include an image source module capable of sending the image data to the processor, wherein the image source module comprises at least one of a receiver, transceiver, and transmitter.

In some implementations, the circuit can include an input device capable of receiving input data and to communicate the input data to the processor.

Another innovative aspect of the subject matter described in this disclosure can be implemented in a system including a voltage data source indicating a first voltage corresponding with transitioning a display unit from providing a first color to a second color, and indicating a second voltage corresponding to the second color; and a driver circuit capable of providing the first voltage to an electrode of the display unit to position a movable element of the display unit from a first position associated with the first color towards a second position associated with the second color, and the driver circuit further capable of providing the second voltage to the electrode of the display unit to position the movable element of the display unit to the second position.

In some implementations, the driver circuit can be further capable of providing the first voltage to move the movable element into a range including the second position.

In some implementations, the second voltage can correspond with a voltage to position the movable element from a position in the range to the second position.

Another innovative aspect of the subject matter described in this disclosure can be implemented in a method including providing, by a driver circuit, a first voltage to an electrode of a display unit to position a movable element of the display unit from a first position towards a second position; and providing, by the driver circuit, a second voltage to the electrode of the display unit to position the movable element of the display unit to the second position.

In some implementations, the method can include providing, by the driver circuit, a third voltage to the electrode of the display unit to release the movable element of the display unit from hysteresis.

In some implementations, releasing the movable element of the display unit from hysteresis can include positioning the movable element to a position outside of a hysteresis region.

In some implementations, the first voltage can correspond with a transition in color of the display unit, the first position corresponding with a first color, and the second position corresponding with a second color.

In some implementations, positioning the movable element of the display unit from the first position towards the second position can include positioning the movable element in a range including the second position.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
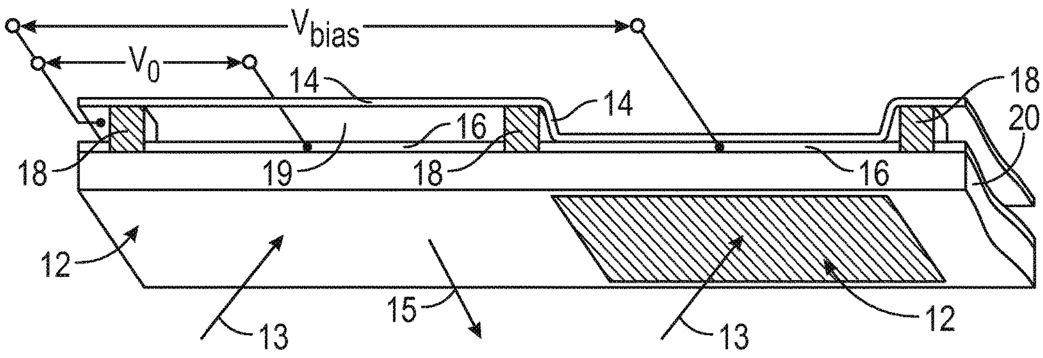
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An interferometric modulator (IMOD) can include a movable element, such as a mirror, that may be positioned at various points (or locations) in order to reflect light at a specific wavelength at each specific point. For example, the movable element can be moved from an initial position associated with a first color (e.g., red) to a second position associated with a second color (e.g., blue).

In some implementations, the IMOD has three (3) terminals. The movable element may be positioned by applying voltages to the three terminals of the IMOD. However, moving directly from the initial position to the second position can be imprecise due to process variations, defects, noise, calibration issues, and/or other conditions affecting the voltages received by the terminals of the IMOD. For example, if the movable element should transition from a position corresponding to red to a position corresponding to blue, then 5 V may need to be applied to an electrode. However, the electrode may receive 4.98 V instead (due to the aforementioned conditions), and therefore, the movable element may be positioned at a slightly incorrect position rather than the expected position. As another example, while 5 V may be the usual, or expected, voltage normally applied for the transition, some electrodes associated with other movable elements may need a slightly different voltage, for example 4.98 V due to process variations (among movable elements) or errors from calibration. This may be problematic because the system may provide voltages to the electrodes of the IMOD based on the expected position of the mirror (i.e., the expected second position rather than the slightly incorrect position). If the movable element is at the incorrect position and the mirror is to move to a third position, the voltage applied to the electrode would be based on the movable element being at the second position rather than the incorrect position, and therefore, the movable element may be positioned to another incorrect position. These positioning errors may accumulate such that eventually the movable element's actual position drifts further and further away from the expected position.

A mechanical reset may be used to position the movable element to a reset position before moving to the second position. The reset position may be an intermediate position between moving the movable element from a first position to a second position. Since the movable element would always be moved to the reset position before moving to the second position, an accumulation of positioning errors can be avoided. However, a mechanical reset may need extra circuitry, decrease color saturation, and may generate visual artifacts.

Some implementations of the subject matter described herein provide for the positioning of the movable element without the mechanical reset. The movable element may move from a first position associated with a first color towards a second position associated with a second color and within a range of the second position by applying a voltage associated with a transition from the first color to the second color. Afterwards, a second voltage may be applied to stabilize the movable element within the range to the specific second position.

Particular implementations of the subject matter described in this disclosure can be implemented to realize one or more of the following potential advantages. Positioning the movable elements without moving to a reset position may allow for increased color saturation. Additionally, visual artifacts from moving to the reset position may be avoided. Moreover, dedicated reset circuitry may also be eliminated.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 μm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
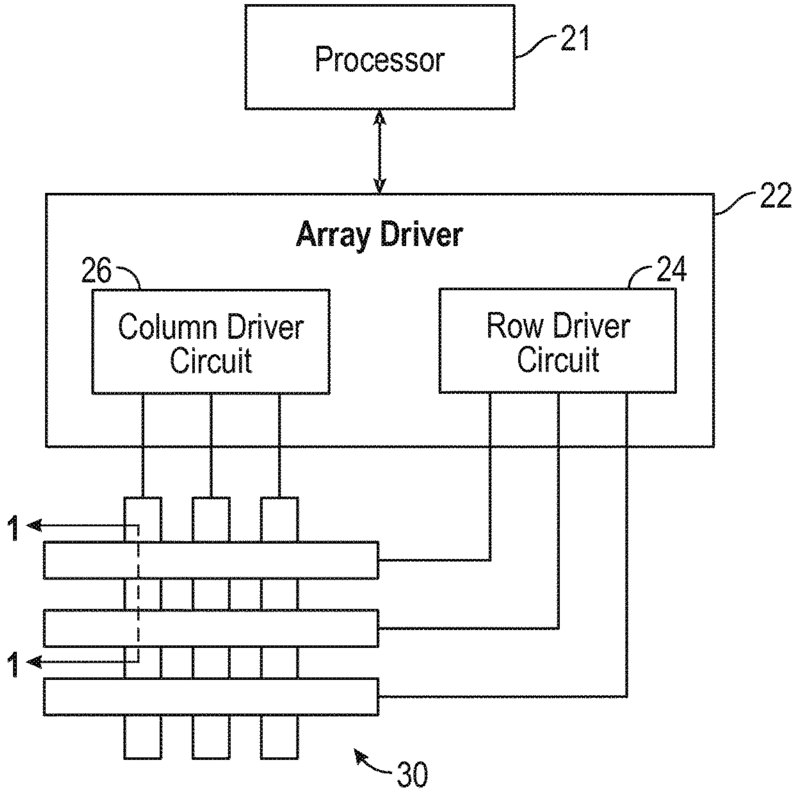
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

In some implementations, the packaging of an EMS component or device, such as an IMOD-based display, can include a backplate (alternatively referred to as a backplane, back glass or recessed glass) which can be configured to protect the EMS components from damage (such as from mechanical interference or potentially damaging substances). The backplate also can provide structural support for a wide range of components, including but not limited to driver circuitry, processors, memory, interconnect arrays, vapor barriers, product housing, and the like. In some implementations, the use of a backplate can facilitate integration of components and thereby reduce the volume, weight, and/or manufacturing costs of a portable electronic device.

Figure 3A:
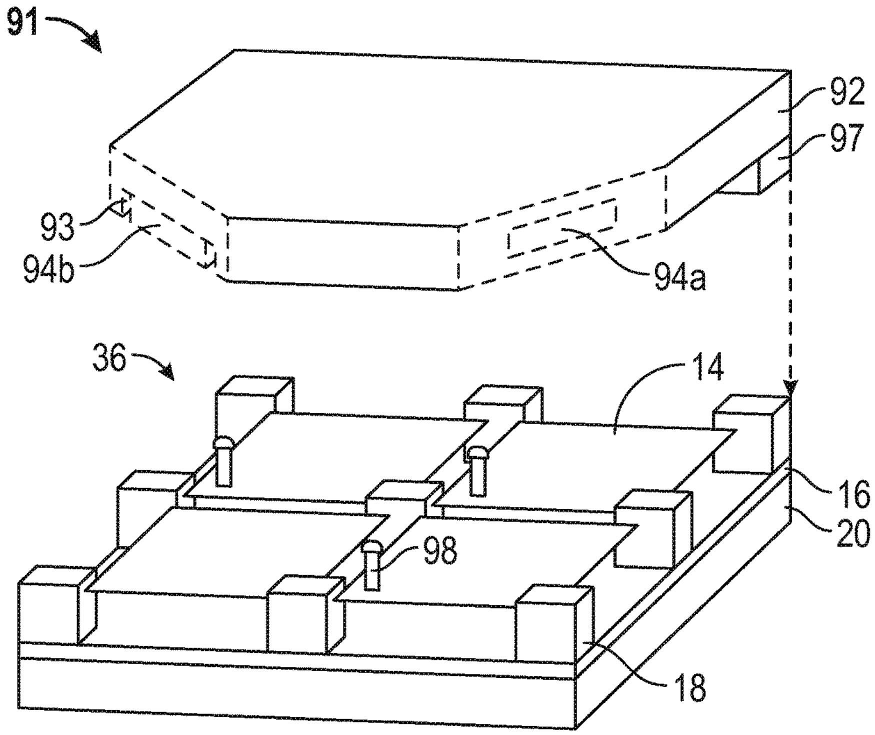
FIGS. 3A and 3B are schematic exploded partial perspective views of a portion of an electromechanical systems (EMS) package including an array of EMS elements and a backplate.
Figure 3B:
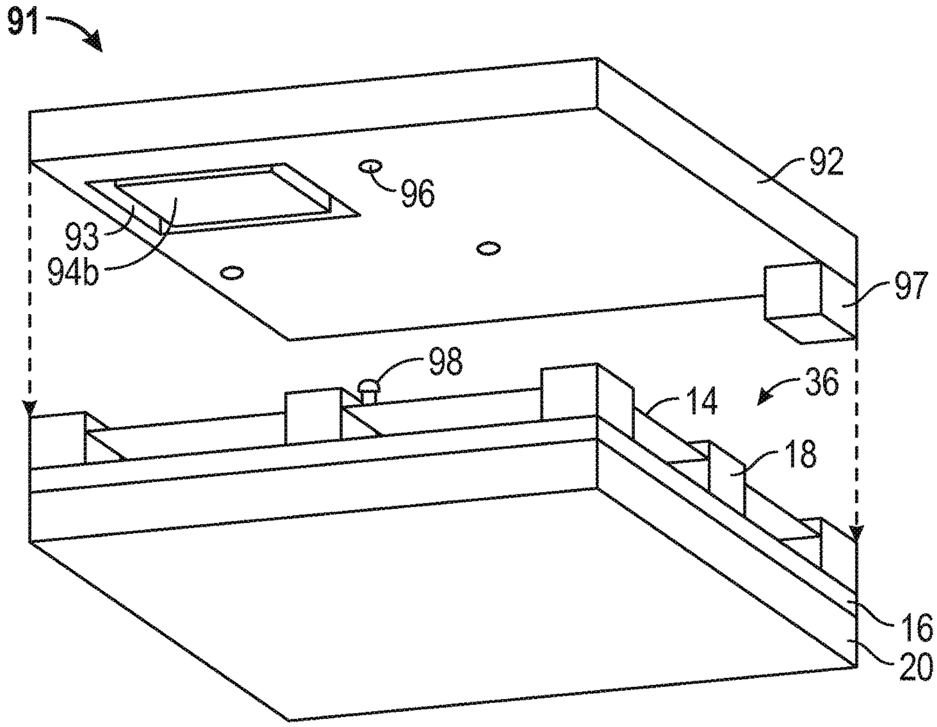

FIGS. 3A and 3B are schematic exploded partial perspective views of a portion of an EMS package 91 including an array 36 of EMS elements and a backplate 92. FIG. 3A is shown with two corners of the backplate 92 cut away to better illustrate certain portions of the backplate 92, while FIG. 3B is shown without the corners cut away. The EMS array 36 can include a substrate 20, support posts 18, and a movable layer 14. In some implementations, the EMS array 36 can include an array of IMOD display elements with one or more optical stack portions 16 on a transparent substrate, and the movable layer 14 can be implemented as a movable reflective layer.

The backplate 92 can be essentially planar or can have at least one contoured surface (e.g., the backplate 92 can be formed with recesses and/or protrusions). The backplate 92 may be made of any suitable material, whether transparent or opaque, conductive or insulating. Suitable materials for the backplate 92 include, but are not limited to, glass, plastic, ceramics, polymers, laminates, metals, metal foils, Kovar and plated Kovar.

As shown in FIGS. 3A and 3B, the backplate 92 can include one or more backplate components 94*a* and 94*b*, which can be partially or wholly embedded in the backplate 92. As can be seen in FIG. 3A, backplate component 94*a* is embedded in the backplate 92. As can be seen in FIGS. 3A and 3B, backplate component 94*b* is disposed within a recess 93 formed in a surface of the backplate 92. In some implementations, the backplate components 94*a* and/or 94*b* can protrude from a surface of the backplate 92. Although backplate component 94*b* is disposed on the side of the backplate 92 facing the substrate 20, in other implementations, the backplate components can be disposed on the opposite side of the backplate 92.

The backplate components 94*a* and/or 94*b* can include one or more active or passive electrical components, such as transistors, capacitors, inductors, resistors, diodes, switches, and/or integrated circuits (ICs) such as a packaged, standard or discrete IC. Other examples of backplate components that can be used in various implementations include antennas, batteries, and sensors such as electrical, touch, optical, or chemical sensors, or thin-film deposited devices.

In some implementations, the backplate components 94*a* and/or 94*b* can be in electrical communication with portions of the EMS array 36. Conductive structures such as traces, bumps, posts, or vias may be formed on one or both of the backplate 92 or the substrate 20 and may contact one another or other conductive components to form electrical connections between the EMS array 36 and the backplate components 94*a* and/or 94*b*. For example, FIG. 3B includes one or more conductive vias 96 on the backplate 92 which can be aligned with electrical contacts 98 extending upward from the movable layers 14 within the EMS array 36. In some implementations, the backplate 92 also can include one or more insulating layers that electrically insulate the backplate components 94*a* and/or 94*b* from other components of the EMS array 36. In some implementations in which the backplate 92 is formed from vapor-permeable materials, an interior surface of backplate 92 can be coated with a vapor barrier (not shown).

The backplate components 94*a* and 94*b* can include one or more desiccants which act to absorb any moisture that may enter the EMS package 91. In some implementations, a desiccant (or other moisture absorbing materials, such as a getter) may be provided separately from any other backplate components, for example as a sheet that is mounted to the backplate 92 (or in a recess formed therein) with adhesive. Alternatively, the desiccant may be integrated into the backplate 92. In some other implementations, the desiccant may be applied directly or indirectly over other backplate components, for example by spray-coating, screen printing, or any other suitable method.

In some implementations, the EMS array 36 and/or the backplate 92 can include mechanical standoffs 97 to maintain a distance between the backplate components and the display elements and thereby prevent mechanical interference between those components. In the implementation illustrated in FIGS. 3A and 3B, the mechanical standoffs 97 are formed as posts protruding from the backplate 92 in alignment with the support posts 18 of the EMS array 36. Alternatively or in addition, mechanical standoffs, such as rails or posts, can be provided along the edges of the EMS package 91.

Although not illustrated in FIGS. 3A and 3B, a seal can be provided which partially or completely encircles the EMS array 36. Together with the backplate 92 and the substrate 20, the seal can form a protective cavity enclosing the EMS array 36. The seal may be a semi-hermetic seal, such as a conventional epoxy-based adhesive. In some other implementations, the seal may be a hermetic seal, such as a thin film metal weld or a glass frit. In some other implementations, the seal may include polyisobutylene (PIB), polyurethane, liquid spin-on glass, solder, polymers, plastics, or other materials. In some implementations, a reinforced sealant can be used to form mechanical standoffs.

In alternate implementations, a seal ring may include an extension of either one or both of the backplate 92 or the substrate 20. For example, the seal ring may include a mechanical extension (not shown) of the backplate 92. In some implementations, the seal ring may include a separate member, such as an O-ring or other annular member.

In some implementations, the EMS array 36 and the backplate 92 are separately formed before being attached or coupled together. For example, the edge of the substrate 20 can be attached and sealed to the edge of the backplate 92 as discussed above. Alternatively, the EMS array 36 and the backplate 92 can be formed and joined together as the EMS package 91. In some other implementations, the EMS package 91 can be fabricated in any other suitable manner, such as by forming components of the backplate 92 over the EMS array 36 by deposition.

Figure 4:
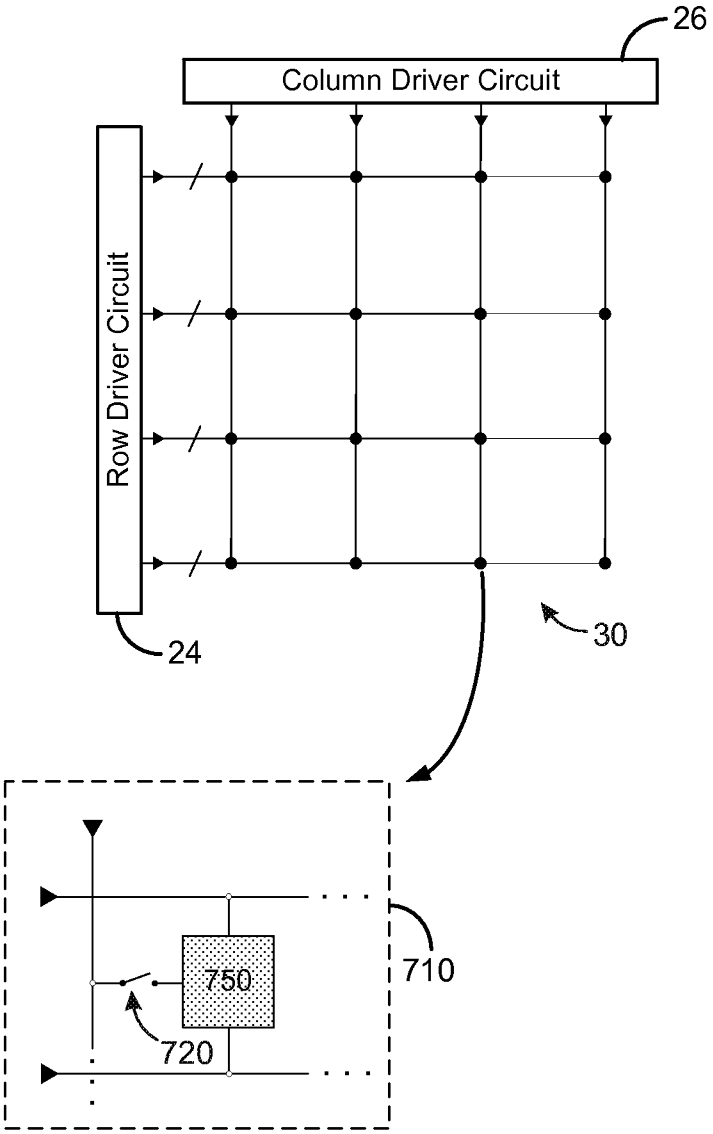
FIG. 4 is an example of a system block diagram illustrating an electronic device incorporating an IMOD-based display.

FIG. 4 is an example of a system block diagram illustrating an electronic device incorporating an IMOD-based display. FIG. 4 depicts an implementation of row driver circuit 24 and column driver circuit 26 of array driver 22 that provide signals to display array or panel 30, as previously discussed.

The implementation of display module 710 in display array 30 may include a variety of different designs. As an example, display module 710 in the fourth row may include switch 720 and display unit 750. Display module 710 may be provided a row signal, reset signal, bias signal, and a common signal from row driver circuit 24. Display module 710 may also be provided a data, or column, signal from column driver circuit 26. In some implementations, display unit 750 may be coupled with switch 720, such as a transistor with its gate coupled to the row signal and its drain coupled with the column signal. Each display unit 750 may include an IMOD display element as a pixel.

Figure 5:
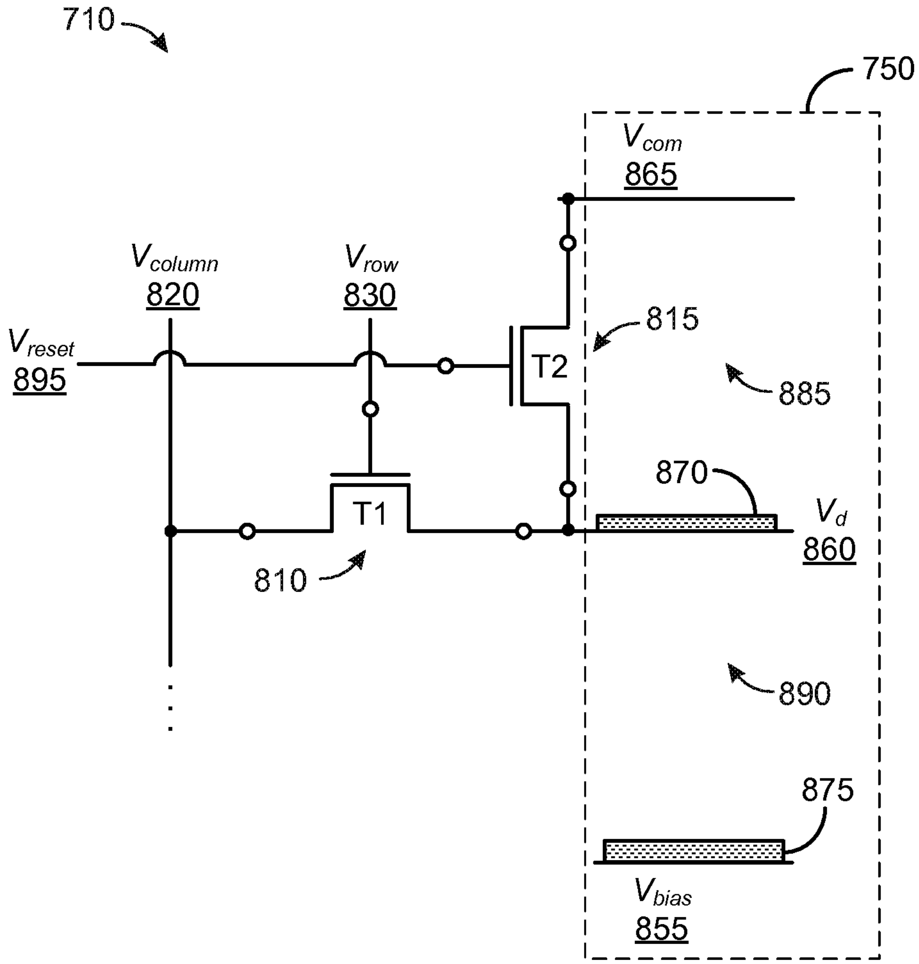
FIG. 5 is a circuit schematic of an example of a three-terminal IMOD.

Some IMODs are three-terminal devices that use a variety of signals. FIG. 5 is a circuit schematic of an example of a three-terminal IMOD. In the example of FIG. 5, display module 710 includes display unit 750 (e.g., an IMOD). The circuit of FIG. 5 also includes switch 720 of FIG. 4 implemented as an n-type metal-oxide-semiconductor (NMOS) transistor T1 810. The gate of transistor T1 810 is coupled to $V_{row}$ 830 (i.e., a control terminal of transistor T1 810 is coupled to $V_{row}$ 830 providing a row select signal), which may be provided a voltage by row driver circuit 24 of FIG. 4. Transistor T1 810 is also coupled to $V_{column}$ 820, which may be provided a voltage by column driver circuit 26 of FIG. 4. If $V_{row}$ 830 (providing a row select signal) is biased to turn transistor T1 810 on, the voltage on $V_{column}$ 820 may be applied to $V_d$ electrode 860. The circuit of FIG. 5 also includes another switch implemented as an NMOS transistor T2 815. The gate (or control) of transistor T2 815 is coupled with $V_{reset}$ 895. The other two terminals of transistor T2 815 are coupled with $V_{com}$ electrode 865 and $V_d$ electrode 860. When transistor T2 815 is biased to turn on (e.g., by a voltage of a reset signal on $V_{reset}$ 895 applied to the gate of transistor T2 815), $V_{com}$ electrode 865 and $V_d$ electrode 860 may be shorted together.

Display unit 750 may be a three-terminal IMOD including three terminals or electrodes: $V_{bias}$ electrode 855, $V_d$ electrode 860, and $V_{com}$ electrode 865. Display unit 750 may also include movable element 870 and dielectric 875. Movable element 870 may include a mirror, as previously discussed. Movable element 870 may be coupled with $V_d$ electrode 860. Additionally, air gap 890 may be between $V_{bias}$ electrode 855 and $V_d$ electrode 860. Air gap 885 may be between $V_d$ electrode 860 and $V_{com}$ electrode 865. In some implementations, display unit 750 may also include one or more capacitors. For example, one or more capacitors can be coupled between $V_d$ electrode 860 and $V_{com}$ electrode 865 and/or between $V_{bias}$ electrode 855 and $V_d$ electrode 860. Other configurations of display unit 750 may include dielectric 875 or another dielectric being close to $V_{com}$ electrode 865.

Movable element 870 may be positioned at various points between $V_{bias}$ electrode 855 and $V_{com}$ electrode 865 to reflect light at a specific wavelength, and therefore, provide color. In particular, voltages applied to $V_{bias}$ electrode 855, $V_d$ electrode 860, and $V_{com}$ electrode 865 may determine the position of movable element 870. Voltages for $V_{reset}$ 895, $V_{column}$ 820, $V_{row}$ 830, $V_{com}$ electrode 865, and $V_{bias}$ electrode 855 may be provided by driver circuits such as row driver circuit 24 and column driver circuit 26. In some implementations, $V_{com}$ electrode 865 may be coupled to ground rather than driven by row driver circuit 24 or column driver circuit 26. Accordingly, movable element 870 may be positioned between $V_{bias}$ electrode 855 and $V_{com}$ electrode 865 and the sizes of air gaps 885 and 890 may change based on the position of movable element 870.

In some implementations, positioning movable element 870 may result in an accumulation of positioning errors that cause the actual position of movable element 870 to deviate from the expected position. For example, movable element 870 may be at a first position such that display unit 750 provides the color red. Display unit 750 may next need to provide the color blue. Therefore, the position of movable element 870 may need to change to a new, second position to provide the color blue. Accordingly, voltages may be applied to $V_{com}$ electrode 865, $V_d$ electrode 860, and $V_{bias}$ electrode 855 such that movable element 870 may be positioned to the new, second position from the first position associated with the color red. Movable element 870 may then be positioned from the second position to a third position to provide another color.

However, positioning movable element 870 directly from the first position to the second position may result in a positioning error. In particular, due to process variations, defects, noise, calibration errors, and other conditions, the voltages applied to an electrode may deviate from the expected voltage. As an example, $V_d$ electrode 860 may need to be biased at 5 V to position movable element 870 to the second position to provide the color blue. However, $V_d$ electrode 860 may in fact be biased at 4.98 V, slightly off from the expected 5 V. As a result, movable element 870 may be positioned at an incorrect position providing a slightly different color than the expected color. When movable element 870 is positioned to the third position, the voltages applied to the electrodes are based on movable element 870 being at the expected position, and therefore, movable element 870 may be positioned to another incorrect position. As movable element 870 is repeatedly positioned, the positioning errors may accumulate such that the actual position of movable element 870 has drifted away from its expected position.

Figure 6A:
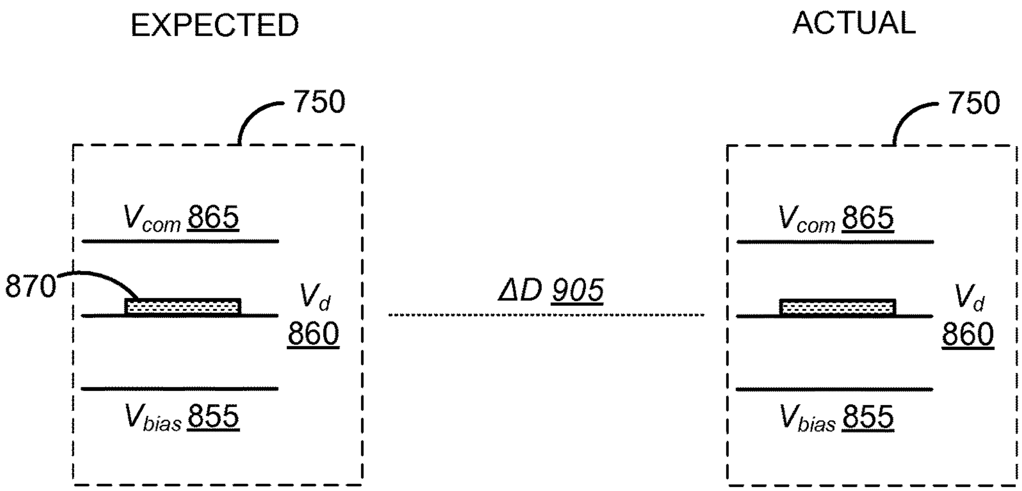
FIGS. 6A, 6B, and 6C illustrate an example of accumulating positioning errors.
Figure 6B:
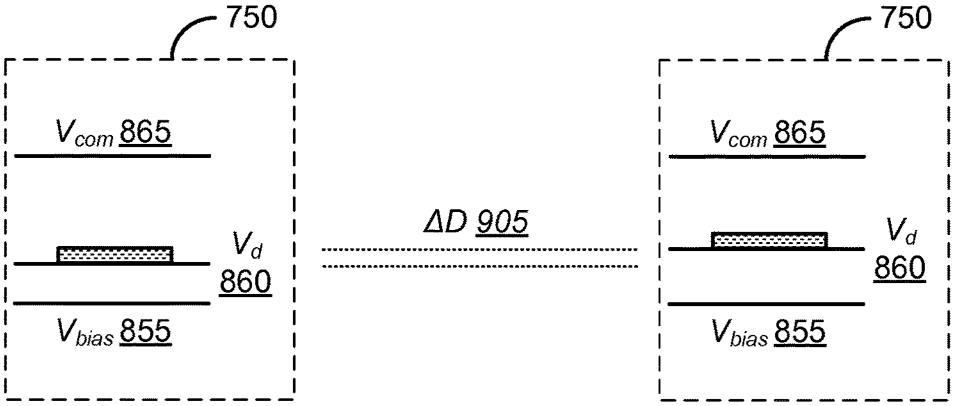
Figure 6C:
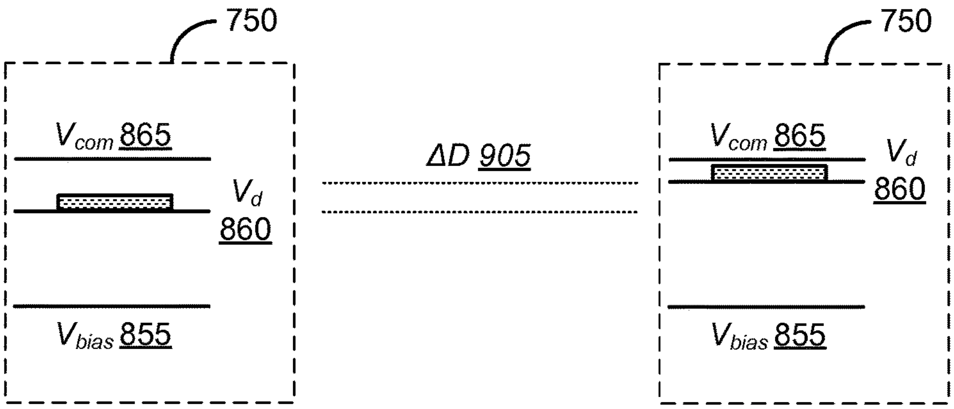

FIGS. 6A, 6B, and 6C illustrate an example of accumulating positioning errors. In FIGS. 6A, 6B, and 6C, the left side portrays the expected position of movable element 870 and the right side portrays the actual position of movable element 870, for example, due to $V_d$ electrode 860 being biased at a slightly off voltage.

In FIG. 6A, movable element 870 may be at an initial position that is the same in the expected and actual scenarios. Accordingly, ΔD 905, representing the difference in position between movable element 870 in the expected and actual scenarios, is zero. Next, in FIG. 6B, movable element 870 may need to be positioned such that display unit 750 provides a new color, and therefore, new voltages may be applied to one or more of the three electrodes. However, ΔD 905 in FIG. 6B shows a non-zero difference between the positions of movable element 870 of the two scenarios as indicated by the dotted lines. That is, the actual position of movable element 870 deviates from the expected position by ΔD 905 due to the aforementioned conditions that allow for an electrode (e.g., $V_d$ electrode 860) to be biased at a slightly incorrect voltage. Next, in FIG. 6C, movable element 870 may need to be positioned again to provide another color. However, since movable element 870 is expected to be at the expected position of FIG. 6B, the electrodes may be biased with a voltage to position movable element 870 from the expected position in FIG. 6B to the expected position in FIG. 6C. Since the actual position of movable element 870 is different than the expected position in FIG. 6B, the voltage applied to the electrode may not be proper (i.e., moving from the actual position in FIG. 6B to the expected position in FIG. 6C may need a different voltage). Accordingly, the actual position of movable element 870 in FIG. 6C drifts farther away from the expected position, indicated by the larger ΔD 905.

A reset scheme to position movable element 870 to an intermediate reset position between positions may be used to reduce the accumulation of positioning errors. FIGS. 7A-E illustrate an example positioning a movable element with an intermediate reset position. Some implementations of this are described in more detail in U.S. patent application Publication Ser. No. 14/021,866, titled DISPLAY ELEMENT RESET USING POLARITY REVERSAL, by Chan et al., filed on Sep. 9, 2013, and is hereby incorporated by reference in its entirety and for all purposes.

Figure 7A:
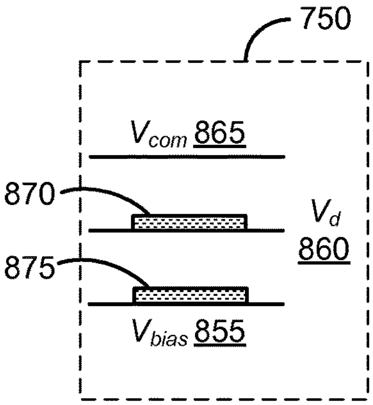
FIGS. 7A-E illustrate an example positioning a movable element with an intermediate reset position.
Figure 7B:
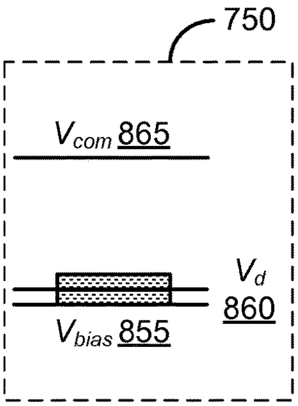
Figure 7C:
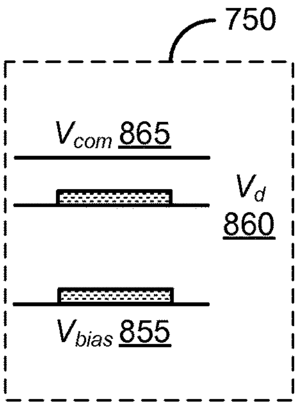
Figure 7D:
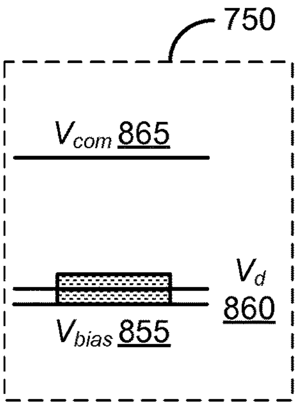
Figure 7E:
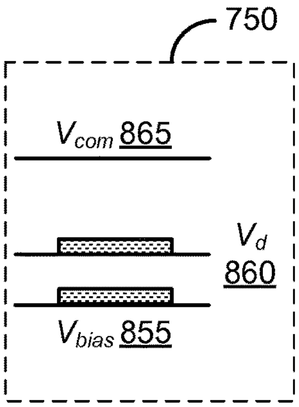

In FIG. 7A, movable element 870 may be at an initial position. Movable element 870 may need to be positioned to a new, second position such that display unit 750 provides a new, second color. However, rather than positioning movable element 870 directly from the initial position to the second position, movable element 870 may be moved to a reset position in FIG. 7B before being positioned to the second position in FIG. 7C. In FIG. 7B, movable element 870 is positioned towards and/or rests against dielectric 875 as the reset position. In particular, voltages may be applied to the electrodes such that movable element 870 is moved (e.g., by forces created by the electric fields generated upon the application of voltages applied to the electrodes) towards $V_{bias}$ electrode 855 and may rest against dielectric 875. Dielectric 875 may be used as a "stop" for movable element 870, and therefore, may provide a reset position, or consistent starting point, for movable element 870 to move to a new position. Accordingly, after movable element 870 has been positioned to the reset position in FIG. 7B, it may be positioned to the second position providing the second color in FIG. 7C. Next, when movable element 870 needs to move to a third, new position providing a third color, it may be repositioned from the second position in FIG. 7C back to the reset position in FIG. 7D, followed by repositioning it in the third position in FIG. 7E.

The reset scheme portrayed in FIGS. 7A-E may reduce the accumulation of positioning errors because movable element 870 is moved to a consistent starting point (e.g., resting against dielectric 875) between repositioning. As a result, if positioning errors occur from the transition from the reset position in FIG. 7B to the second position in FIG. 7C, the positioning errors may not accumulate because movable element 870 would be repositioned to the reset position in FIG. 7D before being repositioned again to FIG. 7E. Positioning errors from the transition from the positions of FIGS. 7B to 7C may be reduced or eliminated by repositioning to the reset position in FIG. 7D before repositioning against to the third position associated with the third color in FIG. 7E.

In some implementations, even if movable element 870 should stay at the same position to provide the same color (e.g., between different frames), it may still be positioned to the reset position and then repositioned back to the same position. The polarity of the electric fields of display unit 750 may be switched to reduce charge accumulation, and therefore, movable element 870 associated with a color or position in a first frame may be moved to the reset position, and then moved back to the same position in a second frame to provide the same color, but the voltages on the electrodes of display unit 750 may be changed. The polarities may also be switched when movable element 870 moves to new positions.

However, positioning movable element 870 to the reset position may introduce visual artifacts, decrease color saturation, and require extra circuitry to provide the reset functionality. For example, if display or array 30 is operating at a lower frequency (e.g., a 1 Hz refresh rate), then a "ripping" process involving biasing each row of display modules 710 one-after-another such that each row of display units 750 is positioned to the proper positions may be visible due to the reset positioning.

Figure 8A:
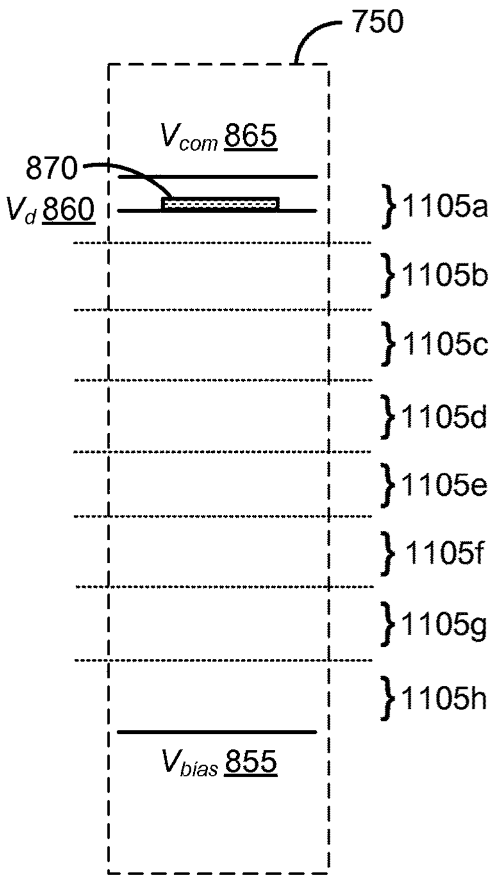
FIGS. 8A, 8B, and 8C illustrate an example of positioning a movable element without an intermediate reset position.
Figure 8B:
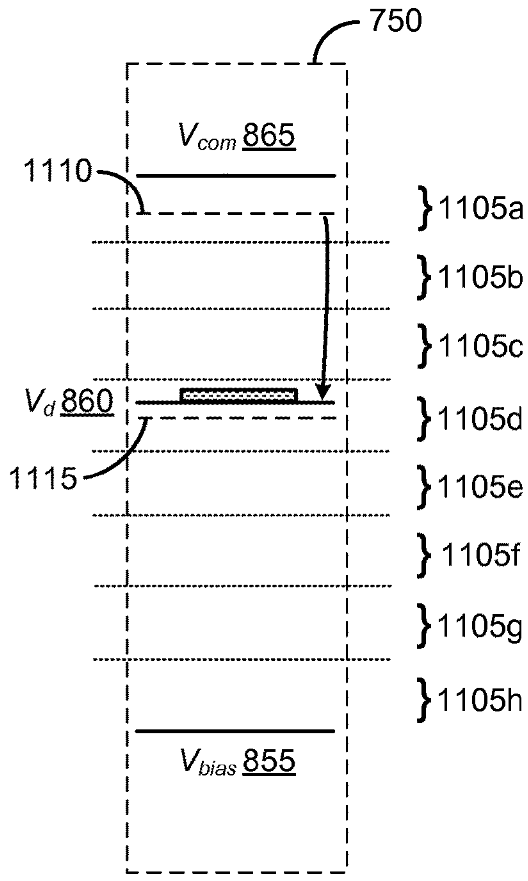
Figure 8C:
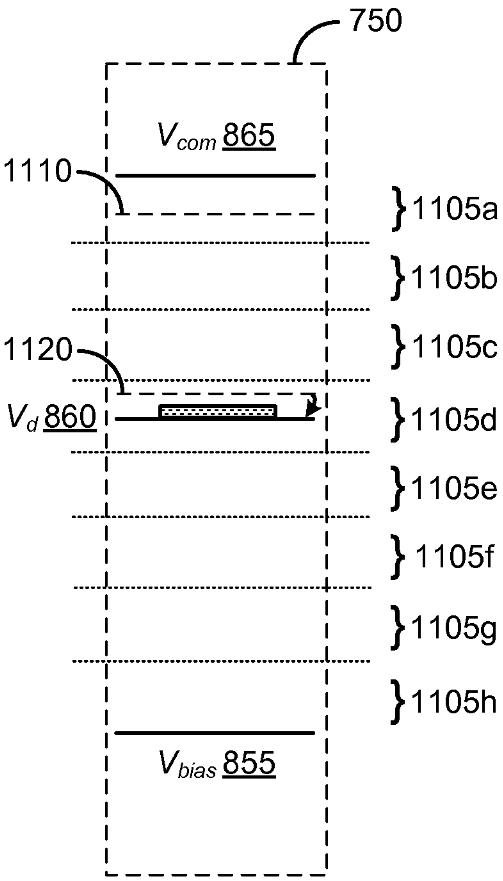

FIGS. 8A, 8B, and 8C illustrate an example of positioning a movable element without an intermediate reset position. Positioning movable element 870 without a reset position may avoid the visual artifacts associated with the intermediate reset position and provide more saturated colors. In particular, movable element 870 may be positioned directly from a first position associated with a first color to a second position associated with a second color through multiple applications of voltages to, for example, $V_d$ electrode 860. In some implementations, a first voltage may be applied to begin positioning movable element 870 towards a new, intended position and within a range of the intended position. Next, a second voltage may be applied to position movable element 870 within the range to stabilize, or be moved to the intended position within the range, and therefore, display unit 750 may provide the intended color. The second voltage that is applied may be the target voltage that $V_d$ electrode 860 should be at for the intended position. As a result, movable element 870 may be repositioned without an intermediate reset position. Moreover, movable element 870 may be repositioned without accumulated errors.

In more detail, the positions that movable element 870 may be positioned to may be among ranges 1105*a*-*h* in FIG. 8A. If the movement range of movable element 870 between $V_{bias}$ electrode 855 and $V_{com}$ electrode 865 allows for different colors (or wavelengths) of the visible spectrum of the electromagnetic spectrum to be the color provided by the respective display unit 750, then each of the middle of the ranges 1105*a*-*h* may be capable of providing different colors. For example, if movable element 870 is positioned in the middle of range 1105*a*, then the color red may be provided. If movable element 870 is positioned in the middle of range 1105*g*, then the color blue may be provided. If movable element 870 is positioned in the middle of range 1105*d*, then the color green may be provided. Though the examples described herein use the middle of ranges 1105*a*-1105*h*, in other scenarios, any positions within the ranges may be used. The middle is selected for the examples for illustrative purposes.

Different voltages may be applied to the electrodes of display unit 750 in order to move movable element 870 to different positions, as previously discussed. For example, if movable element 870 of display unit 750 is at the middle of range 1105*a* reflecting the color red, and it is intended to be repositioned to the middle of range 1105*d* to reflect the color green, then 4.5 V may be applied to $V_d$ electrode 860. However, other voltages may be applied if movable element 870 should be positioned to another color other than green (e.g., positioning from red to blue in the middle of range 1105*g* may need 5 V applied to $V_d$ electrode 860). Accordingly, each transition from one position associated with one color to another position associated with another color may be performed by applying a specific voltage to an electrode. For example, $V_{com}$ electrode 865 may be at 0 V, $V_{bias}$ electrode may switch between 12 V and −12V depending upon a polarity as discussed later herein, and $V_d$ electrode 860 may be applied the voltage corresponding to the transition between the positions and colors.

In FIG. 8B, movable element 870 may need to be repositioned from position 1110 providing the color red in the middle of range 1105*a* to position 1115 providing the color green in the middle of range 1105*d*. Accordingly, array driver 22 (including column driver circuit 26 and row driver circuit 24) may drive $V_d$ electrode 860 to 4.5 V because the transition from position 1110 and red to position 1115 and green may be performed by providing 4.5 V to $V_d$ electrode 860. However, as previously discussed, the voltage at $V_d$ electrode 860 may be slightly off, for example, 4.4 V. As a result, movable element 870 may be moved towards position 1115 from position 1110, but rather than being positioned at the intended position 1115, movable element 870 may be at a slightly different position within range 1105*d*, as in FIG. 8B. Next, in FIG. 8C, array driver 22 may bias $V_d$ electrode 860 with a second voltage to stabilize movable element 870 to the intended position within the range to reflect the color green from position 1120 (i.e., the incorrect position of movable element 870 in FIG. 8B). For example, when movable element 870 is within range 1105*d*, an application of 2 V may allow for it to converge, or reposition, to the middle at position 1115 in range 1105*d*. That is, at any point within range 1105*d*, an application of 2 V may stabilize movable element 870 in the middle of range 1105*d* at position 1115. Generally, getting close to the intended position (e.g., within the range) may allow for movable element 870 to converge upon the application of the voltage.

As another example, while 4.5 V may be the usual, or expected, voltage normally applied for the transition from position 1110 corresponding to red to position 1115 corresponding to green, some electrodes associated with other movable elements 870 may need a slightly different voltage, for example 4.4 V due to process variations or errors from calibration. If 4.5 V is applied to $V_d$ electrode 860, then movable element 870 may also be positioned to position 1120 rather than position 1115. As a result, a similar process as in FIGS. 8A-C may be performed as well.

If the first application of a voltage to $V_d$ electrode 860 positions movable element 870 at the correct, intended position 1115 (i.e., no positioning errors occurred), then the second application of a voltage to $V_d$ electrode 860 would maintain the position of movable element 870.

Each of ranges 1105*a*-1105*h* may be associated with a voltage range or a number of voltages. If movable element 870 is within the range, the application of a particular voltage may allow for the movable element 870 to stabilize to a particular position within the range (e.g., the middle of the range). For example, if movable element 870 is within range 1105*a*, then an application of 2 V may position it to the middle. An application of 2.2 V may position it to a non-middle position. Likewise, if movable element 870 is within range 1105*f*, then 2 V may position it to the middle of range 1105*f*. If movable element 870 is within range 1105*b*, then 2.4 V may position it to the middle of range 1105*b*.

Accordingly, if the current position of movable element 870 is known, the next, intended position may be provided by determining the proper application of voltages to position movable element between positions (e.g., a transition between the current position to an intended position), providing the voltage for positioning or driving movable element 870 towards the intended position and within a range of the intended position (e.g., as in FIG. 8B), and then stabilizing it to the expected and intended position with a subsequent application of voltage (e.g., as in FIG. 8C). As such, a two-part technique with an initial driving portion to move movable element 870 towards an intended position and within a range of the intended position may be performed, followed by a stabilizing portion to position movable element 870 to the final, intended position within the range. Therefore, the two-part technique may position movable element 870 without the use of an intermediate reset position.

Figure 9:
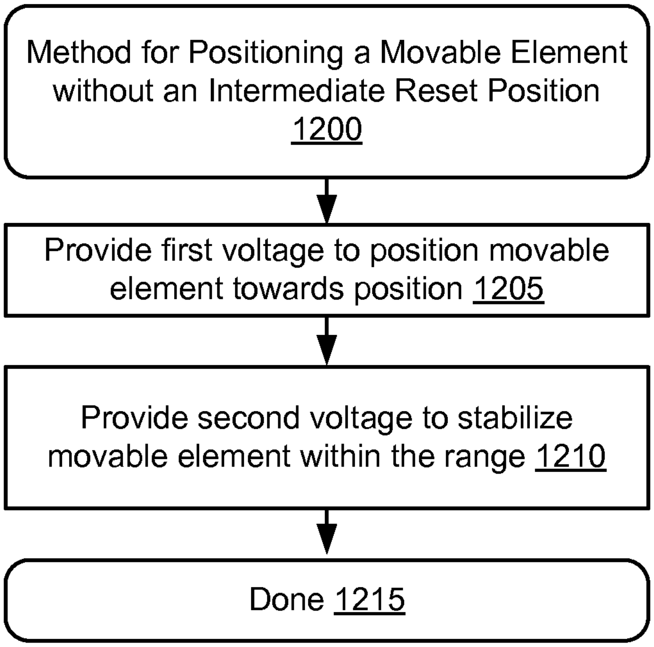
FIG. 9 is a flow diagram illustrating a method to position a movable element without an intermediate reset position.

FIG. 9 is a flow diagram illustrating a method to position a movable element without an intermediate reset position. In method 1200, at block 1205, a first voltage may be applied to an electrode of a display unit 750 to position a movable element towards a new position. For example, a voltage associated with positioning movable element 870 from a first position providing a first color towards a second position providing a second color may be provided to $V_d$ electrode 860 of display unit 750. At block 1210, a second voltage may be applied to $V_d$ electrode 860 of display unit 750 to stabilize movable element 870 in a range such that it positions to the intended position (i.e., the second position providing the second color) from within the range. The method ends at block 1215.

Figure 10A:
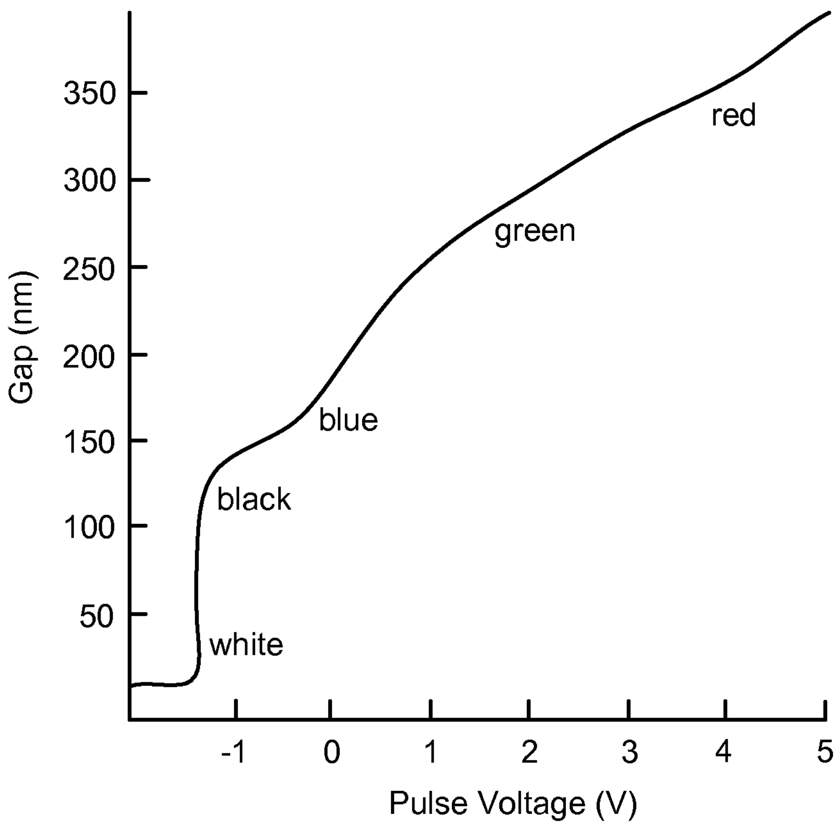
FIGS. 10A, 10B and 10C are charts illustrating an example of positioning a movable element in a hysteresis region.
Figure 10B:
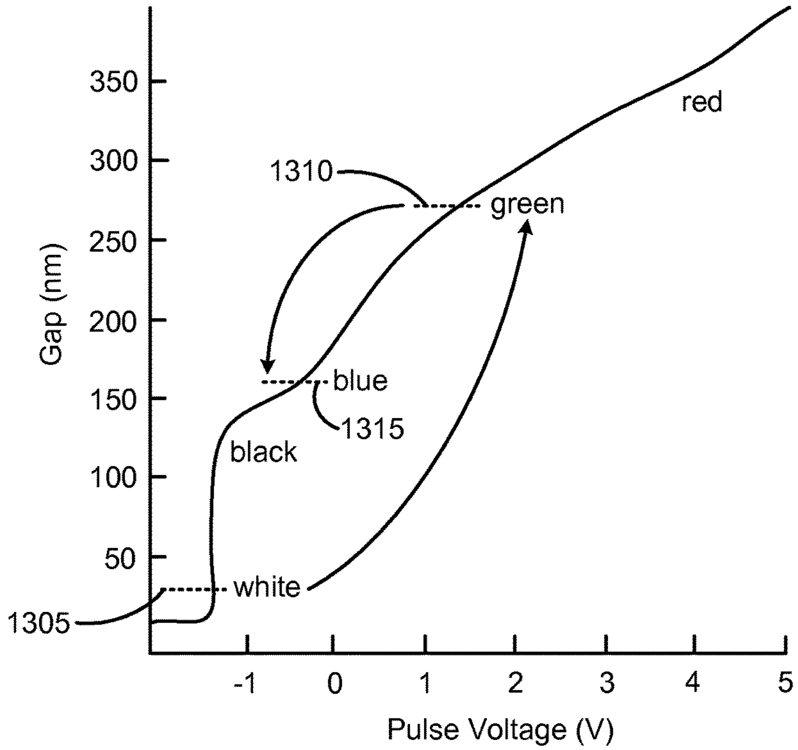
Figure 10C:
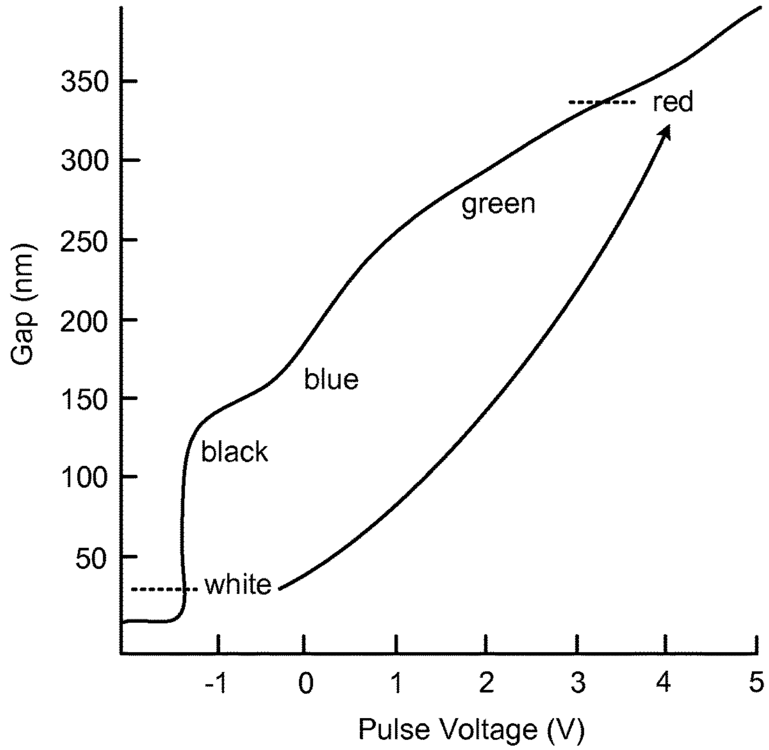

In some implementations, variations to the two-part technique may be performed. For example, positioning movable element 870 from some positions and colors to some other positions and colors may involve a three-part technique. In particular, some positions and colors may not be able to directly transition to another position and color due to hysteresis. For example, an IMOD display element may use, in one implementation, about a 5 volt potential difference to cause the movable reflective layer, or movable element 870 including a mirror, to change from a 4 volt state (or position) to a 5 volt state (or position). However, the movable reflective layer may stay at the 5 volt state as the potential difference drops back below, in this example, 5 volts, because the movable reflective layer does not relax completely until the potential difference drops below 3 volts in this example. Thus the movable reflective layer, in this example, cannot directly transition from the 5 volt state to the 4 volt state. Rather, it has to first transition to a state below 3 volts, then transition to the 4 volt state. FIGS. 10A, 10B, and 10C are charts illustrating an example of positioning a movable element in a hysteresis region.

In FIG. 10A, the chart shows the position of movable element 870 on the y-axis and pulse voltage (e.g., a voltage applied to $V_d$ electrode 860) on the x-axis. Additionally, the chart shows the colors associated with the positions.

In some implementations, movable element 870 at a position associated with the color white may not be able to directly transition to some colors until movable element 870 is "released" from the hysteresis. Releasing movable element 870 from hysteresis may involve positioning movable 870 out of a hysteresis loop (i.e., to a color outside of the hysteresis loop) that may be preventing movable element 870 from directly moving to particular positions within the hysteresis loop. After movable element 870 is released, the two-part technique may be applied. Therefore, transitioning to some positions and colors may need a three-part technique including releasing movable element 870 from hysteresis, driving movable element 870 towards the intended position, and stabilizing to the intended position.

For example, in FIG. 10B, movable element 870 may be at position 1305 associated with the color white. If movable element 870 needs to be positioned to the positions associated with black or blue (i.e., colors associated with positions in a hysteresis region), it may not be able to directly move to the positions. Rather, movable element 870 may need to be released, for example, by first positioning to position 1310 associated with the color green outside of the hysteresis region. Accordingly, the hysteresis region in FIG. 10B may be a hysteresis loop such that if movable element 870 is at position 1305 associated with the color white, it cannot be repositioned to the positions providing black or blue in a single transition. When movable element 870 is at the position providing the color green, it may be out of the hysteresis region, and therefore, may be able to be positioned to any available position, including back into the hysteresis region. For example, in FIG. 10B, movable element 870 may then be able to reposition to position 1315 associated with blue.

Figure 11A:
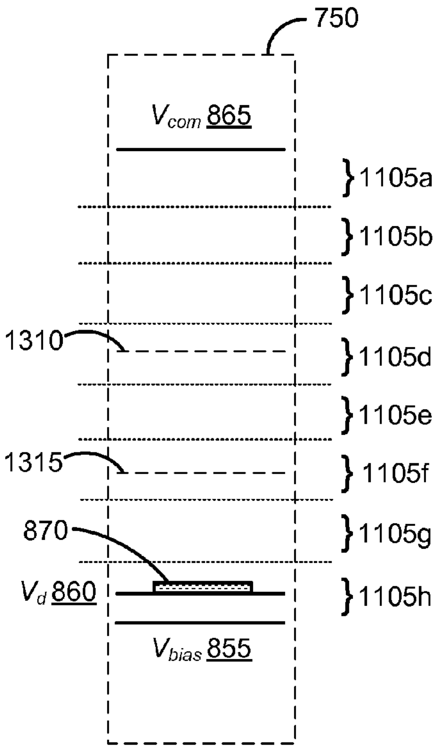
FIGS. 11A-D illustrate an example of positioning a movable element in a hysteresis region.
Figure 11B:
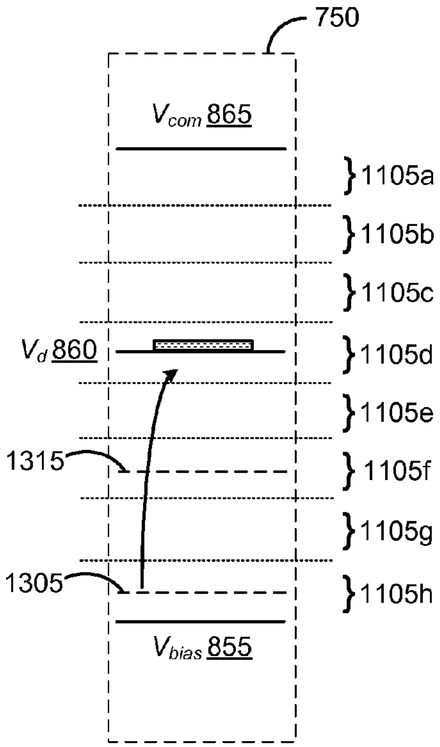
Figure 11C:
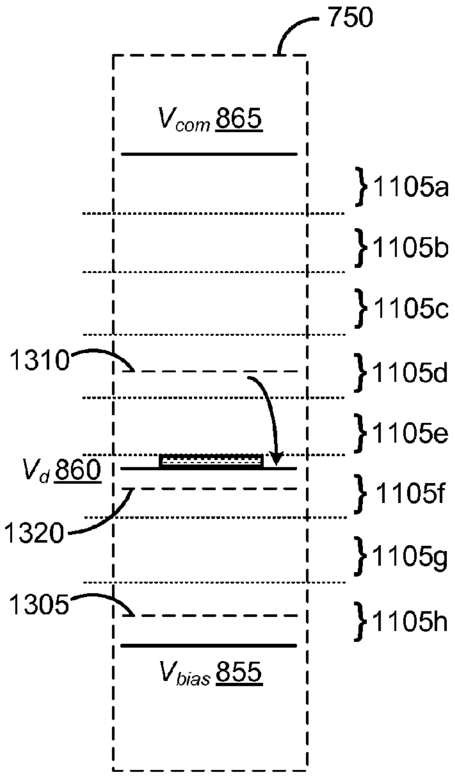
Figure 11D:
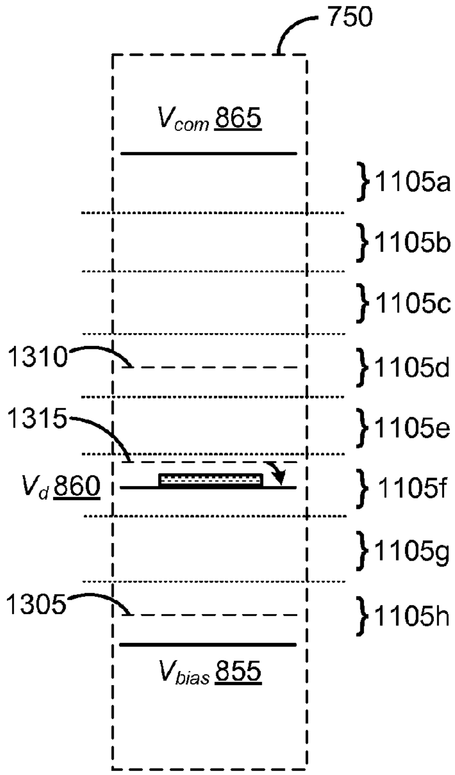

In additional detail, FIGS. 11A-D illustrate an example of positioning a movable element within a hysteresis region. In FIG. 11A, movable element 870 may be at position 1305 in range **1105*h* such that display unit 750 provides the color white. Position 1315 within range 1105*f* may provide the color blue. Ranges 1105*e-h* may be in a hysteresis region such that movable element 870 may not be able to directly reposition from the white position 1305 in range 1105*h* to a position within ranges 1105*e-g*. Rather, movable element 870 may be repositioned to position 1310 providing the color green to be released from the hysteresis region (i.e., outside of ranges 1105*e-h* in the hysteresis region). As a result, in FIG. 11B, movable element 870 moves from position 1305 providing the color white to position 1310 providing the color green. Next, movable element 870 may be driven towards the intended color to range 1105*f* and stabilized at position 1315. For example, in FIG. 11C, movable element 870 may be positioned from position 1310 to within range 1105*f* at position 1315. Next, in FIG. 11D, movable element 870 may be stabilized at position 1320 in range 1105*f*** to provide the color blue.

However, not all positions and colors may be within the hysteresis region. For example, in FIG. 10C, movable element 870 may be repositioned from a position associated with white in the hysteresis region to a position associated with red without first repositioning to the releasing position (i.e., position 1310 and the color green). Rather, the two-part technique as previously described may be performed because the color red is outside of the hysteresis region.

Figure 12:
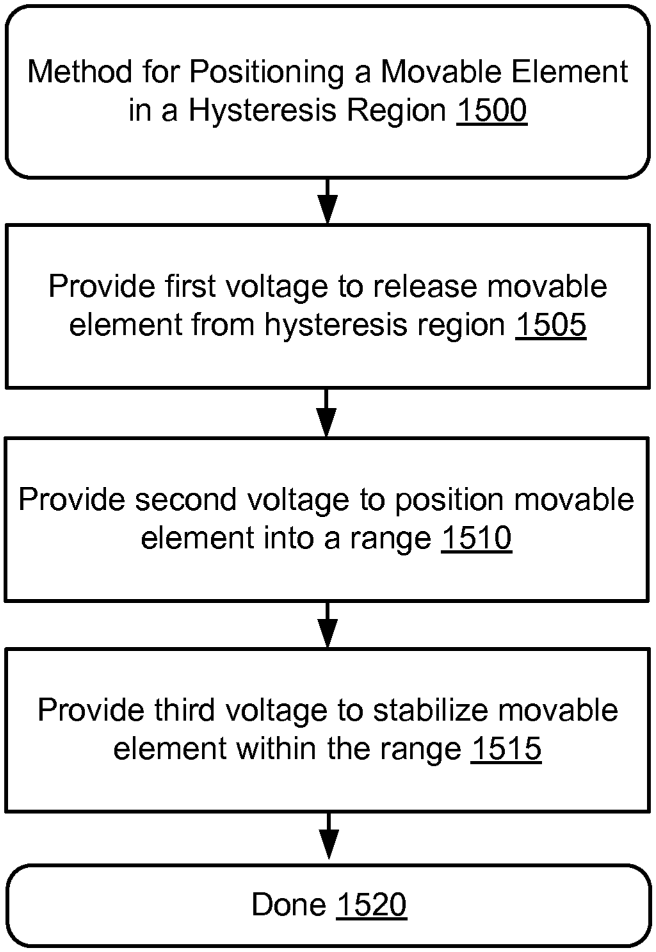
FIG. 12 is a flow diagram illustrating a method to position a movable element in a hysteresis region.

FIG. 12 is a flow diagram illustrating a method to position a movable element in a hysteresis region. In method 1500, at block 1505, a voltage may be provided (e.g., to $V_d$ electrode 860) to release movable element 870 from the hysteresis region. In block 1510, a second voltage may be provided to position the movable element towards an intended position and within a range of the intended position. In block 1515, a third voltage may be provided to stabilize the movable element to the intended position within the range. The method ends at block 1520.

Figure 13:
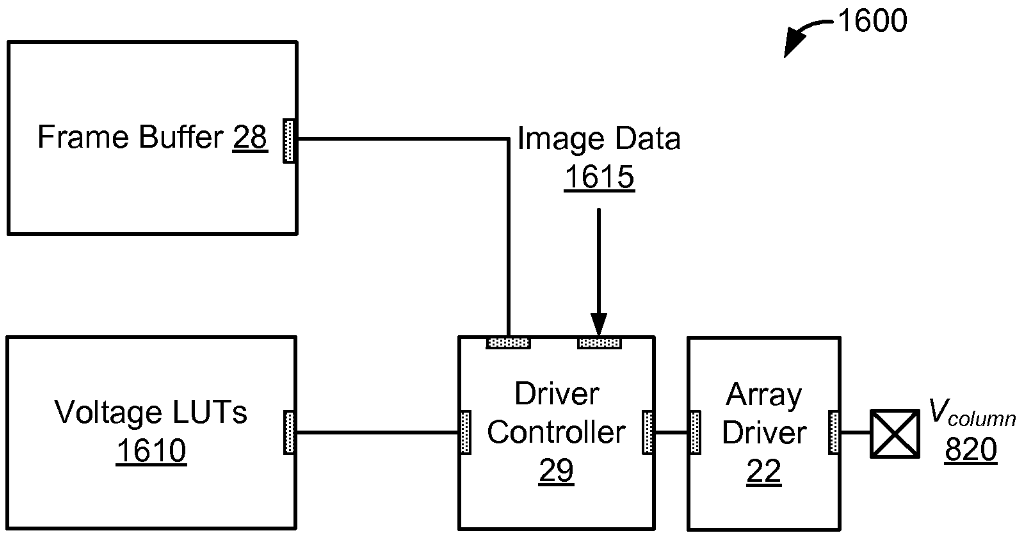
FIG. 13 is an example of a system block diagram for driving a display element.

FIG. 13 is an example of a system block diagram for driving a display element. In FIG. 13, system 1600 may include circuitry to determine the voltages to be applied, for example, to $V_d$ electrode 860 such that movable element 870 may be positioned without a reset position.

In FIG. 13, system 1600 includes frame buffer 28, a storage device to store voltage lookup tables (LUTs) 1610, driver controller 29, and array driver 22. Frame buffer 28 may include information on current image characteristics such as color, as described later herein. Voltage LUTs 1610 may be a voltage data source that may include data indicating voltages for transitions from one color to another color. Driver controller 29 may receive image data 1615, which may include information on what color each movable element 870 of each display unit 750 should be at next. Driver controller 29 may determine the current color of a movable element 870 by finding its corresponding data in frame buffer 28 and may determine the next color that the movable element 870 should be providing based on image data 1615. Accordingly, driver controller 29 may know how each movable element 870 should transition. For example, if a movable element 870 of a display unit 750 is at the position providing color green as indicated in frame buffer 28 and that the same movable element 870 should next provide the color red as indicated in image data 1615, then a transition from green-to-red may need to occur. Voltage LUTs 1610 may be accessed by driver controller 29 to determine the voltages that array driver 22 may need to apply for the green-to-red transition to $V_{column}$ 820, which may be used to bias $V_d$ electrode 860 when $V_{row}$ 830 is biased to turn transistor T1 810 in FIG. 5 on, and therefore, position movable element 870.

Figure 14A:
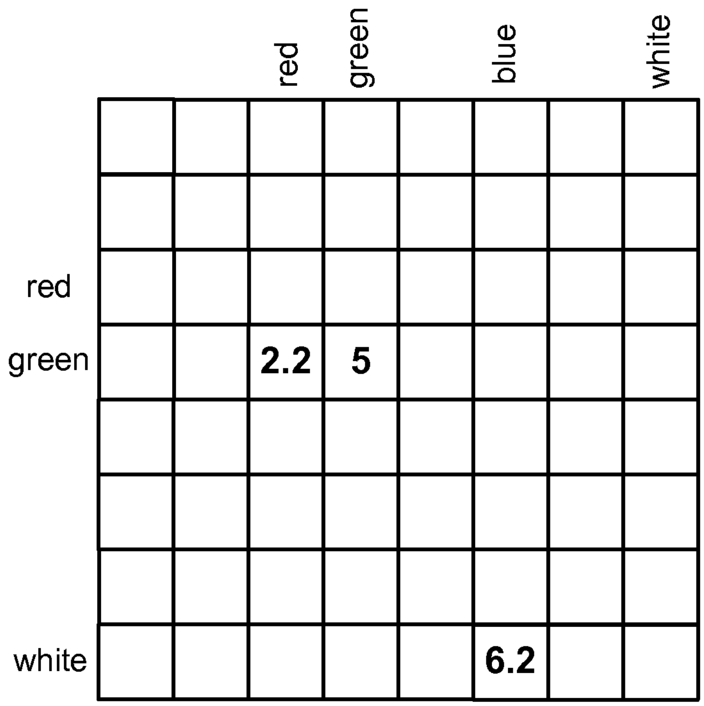
FIGS. 14A, 14B, and 14C illustrate an example of Lookup Tables (LUTs) for driving a display element.
Figure 14B:
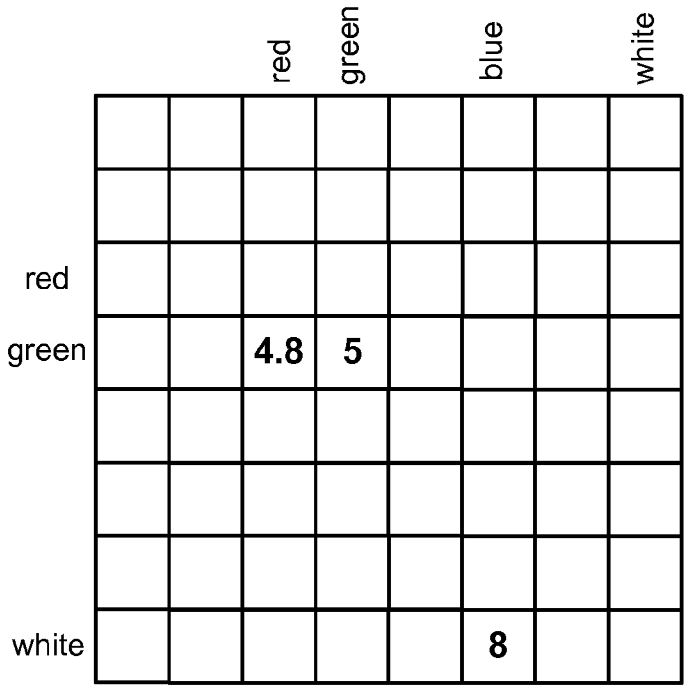
Figure 14C:
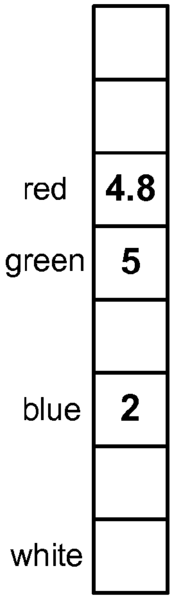

Voltage LUTs 1610 may include LUTs providing information for applying three voltages to $V_d$ electrode 860. FIGS. 14A, 14B, and 14C illustrate an example of Lookup Tables (LUTs) for driving a display element.

In FIGS. 14A, 14B, and 14C, the LUTs may be used to implement the two-part technique including driving and stabilizing as well as implement the three-part technique including releasing, driving, and stabilizing. For example, the LUTs may indicate a series of three voltages to be applied to $V_d$ electrode 860 for each color-to-color transition.

For a movable element 870 in the hysteresis region (e.g., at the color white) and transitioning to another position within the hysteresis region, the first voltage in a first LUT may indicate the voltage to be applied to release movable element 870. The second voltage in a second LUT may indicate the voltage to position movable element 870 to the position associated with the intended color. The third voltage in a third LUT may indicate the voltage to stabilize movable element 870 to the position associated with the intended color.

For a movable element 870 initially outside of the hysteresis region or transitioning to a subsequent position outside of the hysteresis region, the first voltage in the first LUT may indicate the voltage to apply to position movable element 870 towards the position associated with the intended color. The second voltage in the second LUT may indicate the voltage to apply to stabilize movable element 870 to the intended position. The third voltage in the third LUT may be the same as the second voltage. Since movable element 870 need not be released from a hysteresis region, only two different applications of voltages are needed, and therefore, the third voltage may be a repeat of the second voltage. In other implementations, the first application of voltage may be applied twice instead.

For a movable element 870 staying at the same position and color, each voltage indicated in each of the three LUTs may be the same such that movable element 870 does not move to another position.

For example, in FIGS. 14A, 14B, and 14C, each box represents a voltage to be applied to $V_d$ electrode 860 of display unit 750 such that movable element 870 may be positioned properly. The y-axis represents the current color and the x-axis represents the next, intended color of the transition of movable element 870. The LUTs in FIGS. 14A and 14B indicate voltages to be applied for the indicated color transitions. The LUT in FIG. 14C indicates the voltage to be applied based on the intended color (i.e., the color to transition to).

In FIG. 14A, a transition from green-to-red indicates that 2.2 V should be applied to $V_d$ electrode 860. This may be the voltage to position movable element 870 from a position providing the color green to a position providing the color red. However, as previously discussed, $V_d$ electrode 860 may receive a voltage slightly off from 2.2 V. Next, in FIG. 14B, a second LUT indicates that 4.8 V should be applied to position movable element 870 such that it stabilizes to the position providing the color red. In FIG. 14C, a third LUT indicates the same voltage as the second LUT for the intended color.

A transition from green-to-green should apply 5 V to $V_d$ electrode 860, which may be a voltage already applied to it because movable element 870 should not move. Accordingly, each of the LUTs in FIGS. 14A, 14B, and 14C indicate 5 V for the green-to-green transitions and the final intended color of green.

In FIG. 14A, a transition from white-to-blue indicates that 6.2 V should be applied to $V_d$ electrode 860. This may be the voltage to position movable element 870 to the position providing green outside of the hysteresis region so that movable element 870 is released from hysteresis. In FIG. 14B, a white-to-blue transition in the second LUT indicates that 8 V should be applied. This may be the voltage to position movable element 870 from the position providing green to the position providing blue. Next, in FIG. 14B, 2 V may be applied. This may be the voltage to stabilize movable element 870 to the position providing blue.

Figure 15A:
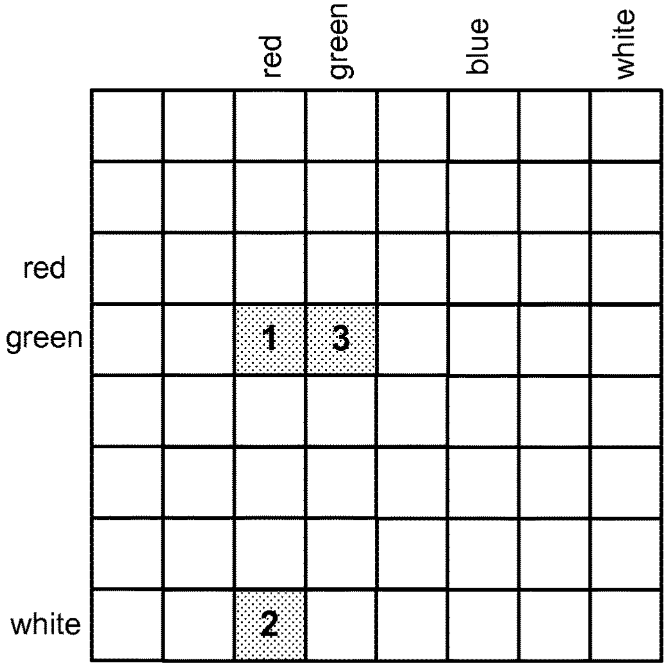
FIGS. 15A, 15B, and 15C illustrate another example of LUTs for driving a display element.
Figure 15B:
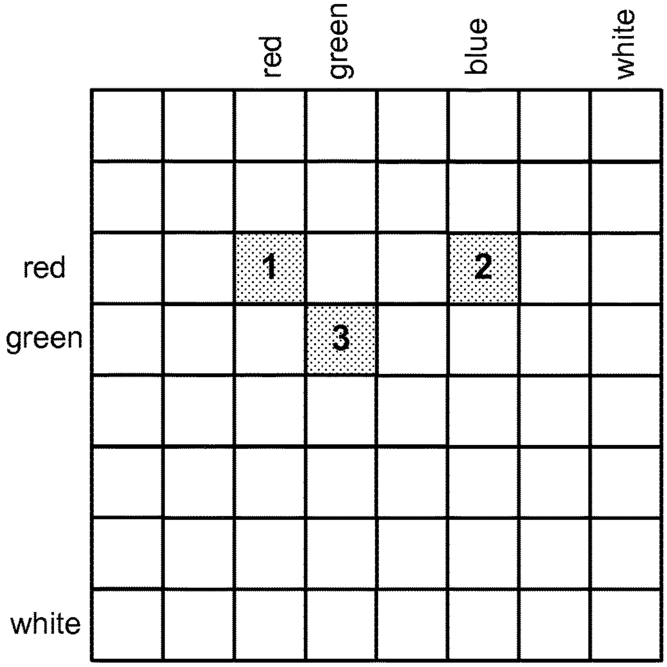
Figure 15C:
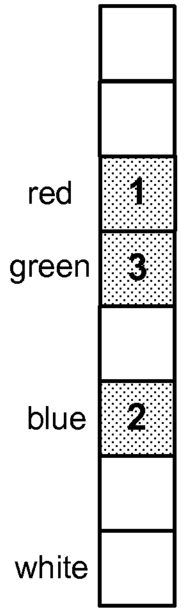

The LUTs may be organized in different ways. FIGS. 15A, 15B, and 15C illustrate another example of LUTs for driving a display element. In FIGS. 15A, 15B, and 15C, the boxes with the label "1" may be used for a green-to-red transition (i.e., a transition outside of the hysteresis region), boxes with the label "2" may be used for a white-to-blue transition (i.e., a transition inside the hysteresis region to another position within the hysteresis region), and boxes with the label "3" may be used for green-to-green transitions (i.e., staying at the same color). For example, in FIG. 15A, a green-to-red transition may first apply a voltage corresponding with the green-to-red transition in FIG. 15A to position movable element 870 towards the intended position providing red. Next, in FIG. 15B, the voltage indicated in the red-to-red transition may indicate the next voltage to apply to stabilize movable element 870 because movable element 870 should be in the range including red. In FIG. 15C, the voltage indicated by the intended color red is then applied, which may be the same as indicated in FIG. 15B.

The above examples of voltages are provided for illustrative purposes. Other implementations may involve other voltages and/or LUTs.

In some implementations, the three voltages may be applied in three different "rips" through each row of display units 750 of the display. For example, in a first rip, each $V_d$ electrode 860 of each display unit 750 in a first row may be applied the first voltage as indicated in the first LUT, followed by each movable element 870 of each display unit 750 in a second row, and so on, until each $V_d$ electrode 860 of each display unit 750 is biased to allow for the corresponding movable element 870 to be released (if in the hysteresis region and transitioning to another position and color in the hysteresis region), driven towards the intended position and color (if transitioning to a position and color outside of the hysteresis region), or be maintained (if the color should not change). Next, each row, row-by-row, may be applied the second voltage as indicated in the second LUT. After each row in the display is provided the second voltage, each row may then be provided the voltages as indicated in the third LUT.

Additionally, the polarities of the electric fields of display unit 750 may also be switched between rips. For example, if $V_{com}$ electrode 865 is 0 V and the voltages indicated in the LUTs are provided to the $V_d$ electrode 860, the voltage applied to $V_{bias}$ electrode 855 may alternate between a positive and negative voltage (e.g., 12 V and −12 V) to reverse the directions of the electric fields, and therefore, reduce charge accumulation across display unit 750. For example, the voltage applied to $V_{bias}$ electrode 855 may switch before or after an application of voltage to $V_d$ electrode 860.

In some implementations, the third rip may not be performed. In particular, the second rip may stabilize movable element 870 for colors outside of hysteresis. For colors within hysteresis and transitioning to another color within hysteresis, enough stability may be provided by first releasing to the position and color outside of the hysteresis region. However, in other implementations, applications of the third rip may be repeated to provide further stability.

Though only three LUTs are shown in the preceding examples, more LUTs may be used. For example, additional LUTs may be used to further take into account polarities. For example, a positive frame with display units 750 having a positive polarity may transition to a negative frame with display units 750 having a negative polarity, and vice versa.

The transitions to the same positions and colors, but with different polarities, may have different LUTs.

Additionally, the LUTs may indicate any number of colors that may be transitioned from or towards. For example, the LUTs herein include eight colors, but any number of colors may be used by the LUTs.

Figure 16A:
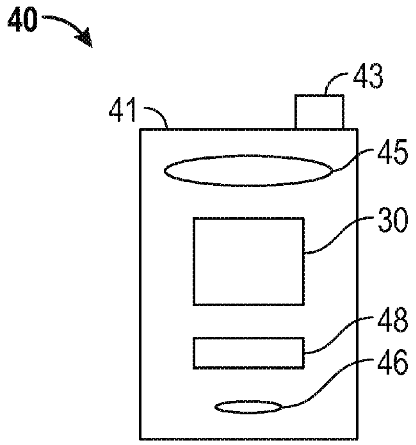
FIGS. 16A and 16B are system block diagrams illustrating a display device that includes a plurality of IMOD display elements.
Figure 16B:
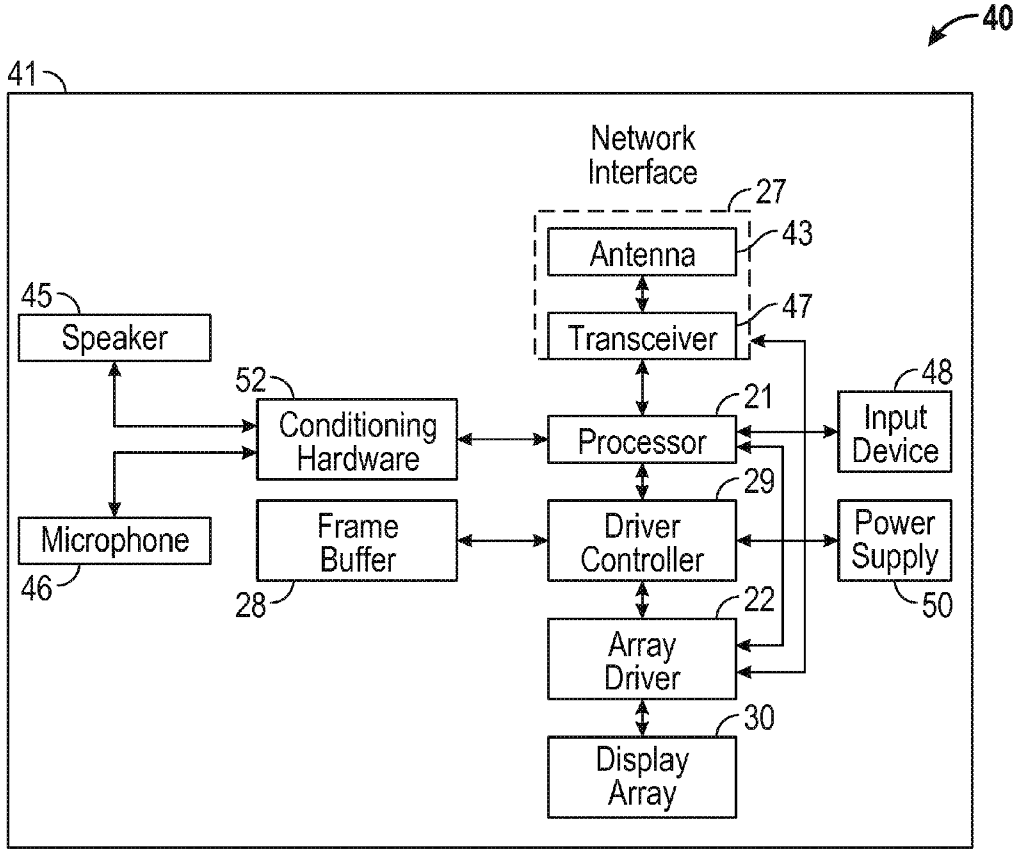

FIGS. 16A and 16B are system block diagrams illustrating a display device 40 that includes a plurality of IMOD display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 16A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 16A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of, e.g., an IMOD display element as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A circuit comprising:

a controller capable of determining a first voltage to apply to an electrode of a display unit of an array of display units to position a movable element of the display unit from a first position to a second position that is within a position range, and the controller further capable of determining a second voltage to apply to the electrode of the display unit to position the movable element of the display unit from the second position to a third position within the position range, the second voltage applied to the electrode of the display unit after the first voltage, wherein the controller determines the first voltage and the second voltage based on stored data indicating a current color corresponding to the first position of the movable element and image data indicating an intended color corresponding to the second position of the movable element, and wherein:

the first voltage corresponds with a transition in color of the display unit from a first color to a second color;

the first position of the movable element corresponds with the first color; and the third position of the movable element corresponds with the second color.

2. The circuit of claim 1, wherein the second voltage corresponds with a voltage to position the movable element from a position in the position range to the third position.

3. The circuit of claim 1, the controller further capable of determining a third voltage to apply to the electrode of the display unit to release the movable element of the display unit from hysteresis.

4. The circuit of claim 3, wherein releasing the movable element of the display unit from hysteresis includes positioning the movable element to a position outside of a hysteresis region.

5. The circuit of claim 1, further comprising:

a frame buffer including data indicating the current color corresponding to the first position of the movable element of the display unit; and a storage device to store lookup tables (LUTs) indicating the first voltage and the second voltage.

6. The circuit of claim 1, further comprising:

a display including the array of display units;

a processor that is capable of communicating with the display device, the processor being configured to process image data; and a memory device that is capable of communicating with the processor.

7. The circuit of claim 6, further comprising:

a driver circuit capable of sending at least one signal to the display; and wherein the controller is capable of sending at least a portion of the image data to the driver circuit.

8. The circuit of claim 6, further comprising:

an image source circuit capable of sending the image data to the processor, wherein the image source circuit comprises at least one of a receiver, transceiver, and transmitter.

9. The circuit of claim 6, further comprising:

an input device capable of receiving input data and to communicate the input data to the processor.

10. A system comprising:

a voltage data source indicating a first voltage corresponding with transitioning a display unit from providing a first color to a second color, and indicating a second voltage corresponding to the second color; and a driver circuit capable of providing the first voltage to an electrode of the display unit to position a movable element of the display unit from a first position to a second position that is within a position range, wherein the first position of the movable element corresponds with the first color and the second position is associated with the second color, and the driver circuit further capable of providing the second voltage to the electrode of the display unit to position the movable element of the display unit from the second position to a third position within the position range, wherein the first voltage and the second voltage are determined based on stored data indicating a current color corresponding to the first position of the movable element and image data indicating an intended color corresponding to the second position of the movable element, wherein the third position of the movable element corresponds with the second color and wherein the second voltage is applied to the electrode of the display unit after the first voltage.

11. The system of claim 10, wherein the voltage data source indicates a third voltage and wherein the driver circuit is capable of providing the third voltage to the electrode of the display unit to release the movable element of the display unit from hysteresis.

12. The system of claim 11, wherein releasing the movable element of the display unit from hysteresis includes positioning the movable element to a position outside of a hysteresis region.

13. A method comprising:

providing, by a driver circuit, a first voltage to an electrode of a display unit to position a movable element of the display unit from a first position to a second position that is within a position range; and providing, by the driver circuit, a second voltage to the electrode of the display unit to position the movable element of the display unit from the second position to a third position within the position range, the second voltage applied to the electrode of the display unit after the first voltage, wherein the first voltage and the second voltage are determined based on stored data indicating a current color corresponding to the first position of the movable element and image data indicating an intended color corresponding to the second position of the movable element and wherein:

the first voltage corresponds with a transition in color of the display unit from a first color to a second color;

the first position of the movable element corresponds with the first color; and the third position of the movable element corresponds with the second color.

14. The method of claim 13, further comprising:

providing, by the driver circuit, a third voltage to the electrode of the display unit to release the movable element of the display unit from hysteresis.

15. The method of claim 14, wherein releasing the movable element of the display unit from hysteresis includes positioning the movable element to a position outside of a hysteresis region.

* * * * *